US005793636A

United States Patent [19]
Cooney et al.

[11] Patent Number: 5,793,636
[45] Date of Patent: Aug. 11, 1998

[54] INTEGRATED FUEL MANAGEMENT SYSTEM

[75] Inventors: Barry F. Cooney, Bethel Park; Thomas M. Camden, Apollo; James P. Duke; David J. Stefko, both of Jeannette, all of Pa.

[73] Assignee: Westinghouse Electric Corporation, Pittsburgh, Pa.

[21] Appl. No.: 431,690

[22] Filed: Apr. 28, 1995

[51] Int. Cl.$^6$ .................................................. G06F 17/60
[52] U.S. Cl. ........................... 364/479.01; 364/478.01; 376/260
[58] Field of Search .................. 364/401–406, 364/478.01, 478.02, 478.07; 376/260, 261, 248, 258, 272, 287; 395/228, 229, 207, 208, 209, 211; 235/376, 385

[56] References Cited

U.S. PATENT DOCUMENTS

| | | |
|---|---|---|
| 4,632,802 | 12/1986 | Herber et al. . |
| 4,842,808 | 6/1989 | Rieben et al. ............... 376/261 |
| 5,043,133 | 8/1991 | Lambert et al. ............. 376/261 |
| 5,448,604 | 9/1995 | Peterson, II ................ 376/261 |
| 5,532,928 | 7/1996 | Stanczyk et al. ............ 364/478.01 |

FOREIGN PATENT DOCUMENTS

| | | |
|---|---|---|
| 263636 | 4/1988 | European Pat. Off. . |
| 280489 | 8/1988 | European Pat. Off. . |
| WO9503614 | 2/1995 | WIPO . |
| WO9513586 | 5/1995 | WIPO . |

OTHER PUBLICATIONS

The Indus Group, Passport Software Solutions, pp. 1–2, Sep. 1993.

J. Goossen, *A Plant Engineering Network at PG&E*, pp. i,1–29,30,258–268, Nov. 21, 1994, Operating Plant Symposium.

J. Goossen, *Plant Engineering Network (PEN)*, pp. 1–9, Nov. 21, 1994, Operating Plant Symposium.

Primary Examiner—Reba I. Elmore
Assistant Examiner—Thomas E. Brown

[57] ABSTRACT

An integrated data management system for compiling information concerning a plurality of nuclear power plant components includes a distributed database for maintaining the information over a lifetime of each of the nuclear power plant components, data entry terminals for entering the information in the distributed database, and data retrieval terminals for retrieving the information from the distributed database. The database is distributed by a wide-area network interconnecting the data entry and data retrieval terminals with distributed workstations which access the information.

14 Claims, 10 Drawing Sheets

OID HISTORY:COMPONENT_HISTORY —162

| STRUCTURE | CONTENTS | |
|---|---|---|
| COMPONENT OID | 123 | 196 |
| PTR:FIRST HISTORY OBJECT | H12 | 198 |
| PTR:LAST HISTORY OBJECT | H44 | 200 |

H12:
| STRUCTURE | CONTENTS | |
|---|---|---|
| COMPONENT OID (CID) | 123 | 202 |
| LOCATION OID (LID) | 12 | 204 |
| ARRIVAL TIME (TA) | 01/01/78 8:22 AM | 206 |
| DEPARTURE TIME (TD) | 01/02/78 8:45 AM | 208 |
| ACTION (ACT) | NORMAL RECEIPT | 210 |
| PTR:NEXT COMP'S HISTORY OBJECT (PTNC) | H234 | 212 |
| PTR:NEXT LOC'S HISTORY OBJECT (PTNL) | H13 | 214 |

H13:
| STRUCTURE | CONTENTS |
|---|---|
| COMPONENT OID | 123 |
| LOCATION OID | 222 |
| ARRIVAL TIME | 01/02/78 9:22 AM |
| DEPARTURE TIME | 04/12/93 8:45 PM |
| ACTION | NORMAL STORAGE |
| PTR:NEXT COMP'S HISTORY OBJECT | H345 |
| PTR:NEXT LOC'S HISTORY OBJECT | H35 |

H35:
| STRUCTURE | CONTENTS |
|---|---|
| COMPONENT OID | 123 |
| LOCATION OID | 1111 |
| ARRIVAL TIME | 04/13/93 9:12 AM |
| DEPARTURE TIME | 10/12/94 4:12 PM |
| ACTION | NORMAL REFUELING |
| PTR:NEXT COMP'S HISTORY OBJECT | H456 |
| PTR:NEXT LOC'S HISTORY OBJECT | H44 |

H44:
| STRUCTURE | CONTENTS |
|---|---|
| COMPONENT OID | 123 |
| LOCATION OID | 111 |
| ARRIVAL TIME | 10/13/94 3:13 PM |
| DEPARTURE TIME | 0 |
| ACTION | INSTALLED |
| PTR:NEXT COMP'S HISTORY OBJECT | 0 |
| PTR:NEXT LOC'S HISTORY OBJECT | 0 |

INTEGRATED FUEL MANAGEMENT SYSTEM

CROSS REFERENCE TO RELATED APPLICATIONS

This Application is related to a commonly assigned copending application Ser. No. 08/096,316, filed Jul. 23, 1993, entitled "SYSTEM FOR AUTOMATIC REFUELING OF A NUCLEAR REACTOR" by Stefko et al. (Attorney Docket No. 57,999).

BACKGROUND OF THE INVENTION

1. Field of the Invention

This invention relates to a system for compiling information and, more particularly, to an integrated data management system for compiling information concerning a variety of nuclear power plant components over a lifetime thereof.

2. Background of Information

In a typical nuclear reactor, the reactor core includes a large number of elongated fuel assemblies. Conventional designs of these fuel assemblies include top and bottom nozzles, a plurality of elongated transversely spaced guide thimbles extending longitudinally between and connected at opposite ends to the nozzles, and a plurality of transverse support grids axially spaced along the guide thimbles. Each fuel assembly also includes a multiplicity of elongated fuel elements or rods. The fuel rods are transversely spaced apart from one another and from the guide thimbles. The transverse grids support the fuel rods between the top and bottom nozzles. The fuel rods each contain fissile material in the form of a plurality of generally cylindrical nuclear fuel pellets maintained in a row or stack thereof in the rod. The fuel rods are grouped together in an array which is organized so as to provide a neutron flux in the core sufficient to support a high rate of nuclear fission and, thus, the release of a large amount of energy in the form of heat.

Nuclear power plant components include nuclear fuel components, special nuclear material (SNM) such as uranium or plutonium, and nuclear non-fuel components. Nuclear fuel components include nuclear fuel assemblies and nuclear fuel rods or pins. Examples of a nuclear fuel assembly and a nuclear fuel rod are disclosed in U.S. Pat. No. 4,842,808, issued Jun. 27, 1989, which is herein incorporated by reference. Nuclear non-fuel components include, for example, burnable absorbers (BA), rod cluster control assemblies (RCCA), thimble plugs, neutron sources, spent fuel rack inserts, SNM data detectors, dummy fuel assemblies, pellet cans, failed fuel cans, and boraflex coupon samples as well as other components located either inside or outside the reactor core.

Between the manufacturing of such nuclear power plant components by a vendor external to the individual nuclear utility site, to receipt of such components at such site, to final storage at or away from such site, the nuclear power plant components are stored in a variety of off-site and on-site locations such as, for example, in various locations at the external vendor site, various new fuel storage locations, core locations, and spent fuel locations. During this time frame, and over the operational lifetime of the nuclear site (which generally has a different initial manufacturing date than the manufacturing date of the nuclear power plant components, and which generally has a common end date), the burnup energy (i.e., the specific energy in terms of MW-days per metric ton of uranium metal) produced by any nuclear fuel assembly must be accurately tracked and reported to support various Nuclear Regulatory Commission (NRC) reporting requirements. Isotopic data for uranium and plutonium isotopes (i.e., KG per metric ton of initial uranium and/or plutonium metal) must also be reported. Furthermore, during refueling operations, for example, the nuclear fuel assemblies must be efficiently transferred or "shuffled" between the various new fuel storage locations, core locations, and spent fuel locations.

Previously, a complete data set associated with all of the nuclear power plant components for a nuclear utility was partially stored at a variety of discrete locations such as, for example, on paper, in various disk storage media, or in various non-integrated computer systems. Such complete data set was not easily or directly accessible at any one location. Accordingly, such data storage is, at best, subject to inefficient transfer between the discrete locations by manually entering data or by physically transferring disks. Furthermore, such inefficient transfer typically results in the use of "stale" data, caused by transport delays, and erroneous data, caused by transport errors. Therefore, there is room for improvement.

SUMMARY OF THE INVENTION

The invention is directed to an integrated data management system for compiling information concerning a plurality of nuclear power plant components. The system includes a database mechanism for maintaining the information over a lifetime of each of the nuclear power plant components, a data entry mechanism for entering the information in the database mechanism, and a data retrieval mechanism for retrieving the information from the database mechanism.

One of the nuclear power plant components may be manufactured at a manufacturing site and the data entry mechanism may include a mechanism for entering manufacturing information pertaining to such nuclear power plant component at the manufacturing site. The data retrieval mechanism may include a mechanism for retrieving the information pertaining to the nuclear power plant components at the manufacturing site.

The data entry mechanism may include a calculation mechanism for calculating a nuclear parameter for one of the nuclear power plant components and entering the nuclear parameter in the database mechanism. The calculation mechanism may include a mechanism calculating the nuclear parameter as a function of the location of one of the nuclear power plant components. The data entry mechanism may also include a real-time mechanism for updating the database mechanism with a current location for one of the nuclear power plant components.

The database mechanism may include a wide-area network communication mechanism and at least one workstation mechanism having a mechanism for storing at least a portion of the information. The workstation mechanism may execute a database process which accesses the information. The data entry mechanism may further include at least one entry terminal. The wide-area network communication mechanism may interconnect the workstation mechanism and the entry terminal which transfers a portion of the information through the wide-area network communication mechanism to the database process of the workstation mechanism.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
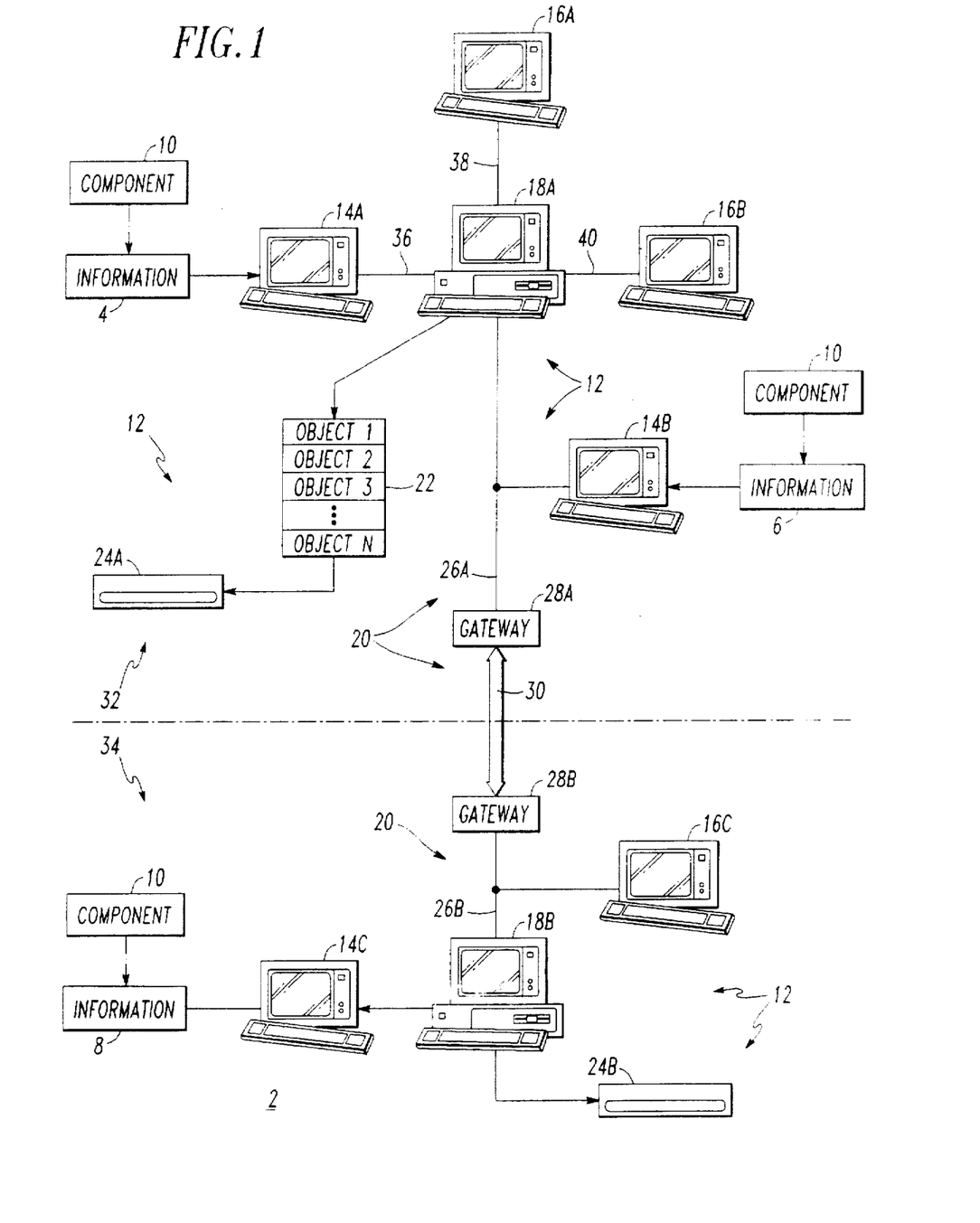
FIG. 1 is a block diagram of an integrated data management system in accordance with the present invention.

Referring to FIG. 1, a block diagram of an integrated data management system 2 is illustrated. The system 2 compiles information 4, 6, 8 concerning a plurality of nuclear power plant components 10 (as shown in greater detail in FIG. 2). The system 2 includes a database 12, a plurality of data entry terminals 14A, 14B, 14C for entering the respective information 4, 6, 8 into the database 12, and a plurality of data retrieval terminals 16A, 16B, 16C for retrieving the information 4, 6, 8 from the database 12. The exemplary database 12 includes a plurality of workstations 18A, 18B and a communications network 20. The workstations 18A, 18B service requests from the various terminals 14A, 14B, 14C, 16A, 16B, 16C and store and retrieve plural objects 22 (shown with the workstation 18A) from disk memories 24A, 24B, respectively. Although the exemplary object oriented database 12 is preferred for performance reasons such as speed of access, the invention is also applicable to other databases, such as, for example, a relational database. The invention is further applicable to terminals 14A, 14B, 14C, 16A, 16B, 16C which both enter and retrieve information 4, 6, 8.

The exemplary wide-area communications network 20 includes two local area networks 26A, 26B and respective gateways 28A, 28B which are interconnected by a data link 30, such as a Ti communications link. In this manner, the information 4, 6 and 8 of two or more physically separate areas 32 and 34, respectively, is integrated into and is accessible by the system 2. For example, the information 4, 6 from area 32 may be entered locally at a nuclear utility, while the information 8 from area 34 may be entered remotely by an external vendor of nuclear components for such utility. Similarly, the separate areas 32, 34 may be different nuclear electric generation sites of a common nuclear utility enterprise. The exemplary network 26A interconnects the workstation 18A, the data entry terminal 14B and the gateway 28A. The exemplary network 26B interconnects the workstation 18B, the data retrieval terminal 16C and the gateway 28B.

The wide-area nature of the communications network 20 permits the same information 4, 6, 8 with the same pedigree to be used by any interested user irrespective of the user's location. Instead of each user generating separate information from different data, the information for each user is maintained and processed within the single, universally available, integrated data management system 2. This reduces the probability of transcription errors between users and, also, ensures that the information 4, 6, 8 is always immediately available. The wide-area network 20, further, allows interfaces to different vendors such as, for example, the nuclear core designer (e.g., which generates fuel assembly loading patterns from engineering analysis codes, isotopic data from engineering analysis codes, etc.) and the manufacturing plant for the pins (e.g., which generates the fuel related information for the pins received on site). Therefore, all information 4, 6, 8 may be stored and later accessed from the various sites 32, 34 of the communications network 20.

The exemplary workstations 18A and 18B, in turn, interface the terminals 14A, 16A, 16B and 14C, respectively, between the database 12 and the communications network 20. The workstations 18A, 18B also access the disk memories 24A, 24B for storing and retrieving the information 4, 6, 8, respectively. The database process for accessing the information 4–6, 8 by the workstations 18A, 18B is discussed in greater detail below with FIGS. 5A–5B and 6A–6E.

The exemplary data entry terminal 14A, for example, transfers the information 4 through a local data link 36 to the database process of the workstation 18A. The exemplary data entry terminal 14B transfers the information 6 through the local area network 26A to the database process of the workstation 18A. The exemplary data retrieval terminals 16A, 16B request information from the database process of the workstation 18A through data links 38, 40, respectively. In turn, the database process of workstation 18A accesses the requested information 4, 6, 8 from either the disk 24A in area 32 or the disk 24B in area 34. The data retrieval terminals 16A, 16B, 16C, as discussed in greater detail with FIGS. 5A–5B and 6A–6E, retrieve and process this requested information 4, 6, 8. Those skilled in the art will appreciate that the terminals 14C, 16C, the workstation 18B and the local area network 26B in area 34 operate in a similar manner as the corresponding devices in area 32.

The database 12 maintains the information 4, 6, 8 over a lifetime of each of the various nuclear power plant components 10. Each of the components 10 is tracked between the time of original manufacturing until the time of final disposal of each component 10. In other words, the system 2 tracks each component 10, for example, from manufacturing at an off-site location, through original receipt at a first location, through storage at a second location, through operation at another location, through storage at still another location, until final disposal at a final location. For example, a sub-component (e.g., a pin) of a component 10 (e.g., a fuel assembly) may initially be manufactured by a first vendor at a first vendor location, received from a shipping truck by a second vendor at a second vendor location, and received at a power plant or at a particular power plant complex of a nuclear utility. The component 10 may then be used at any complex of the nuclear utility and at any of a wide variety of different locations (e.g., in a spent fuel pool, in dry storage, in the core, etc.). Finally, the component 10 may be disposed at a final on-site or off-site disposal facility at or away from the nuclear utility.

Figure 2:
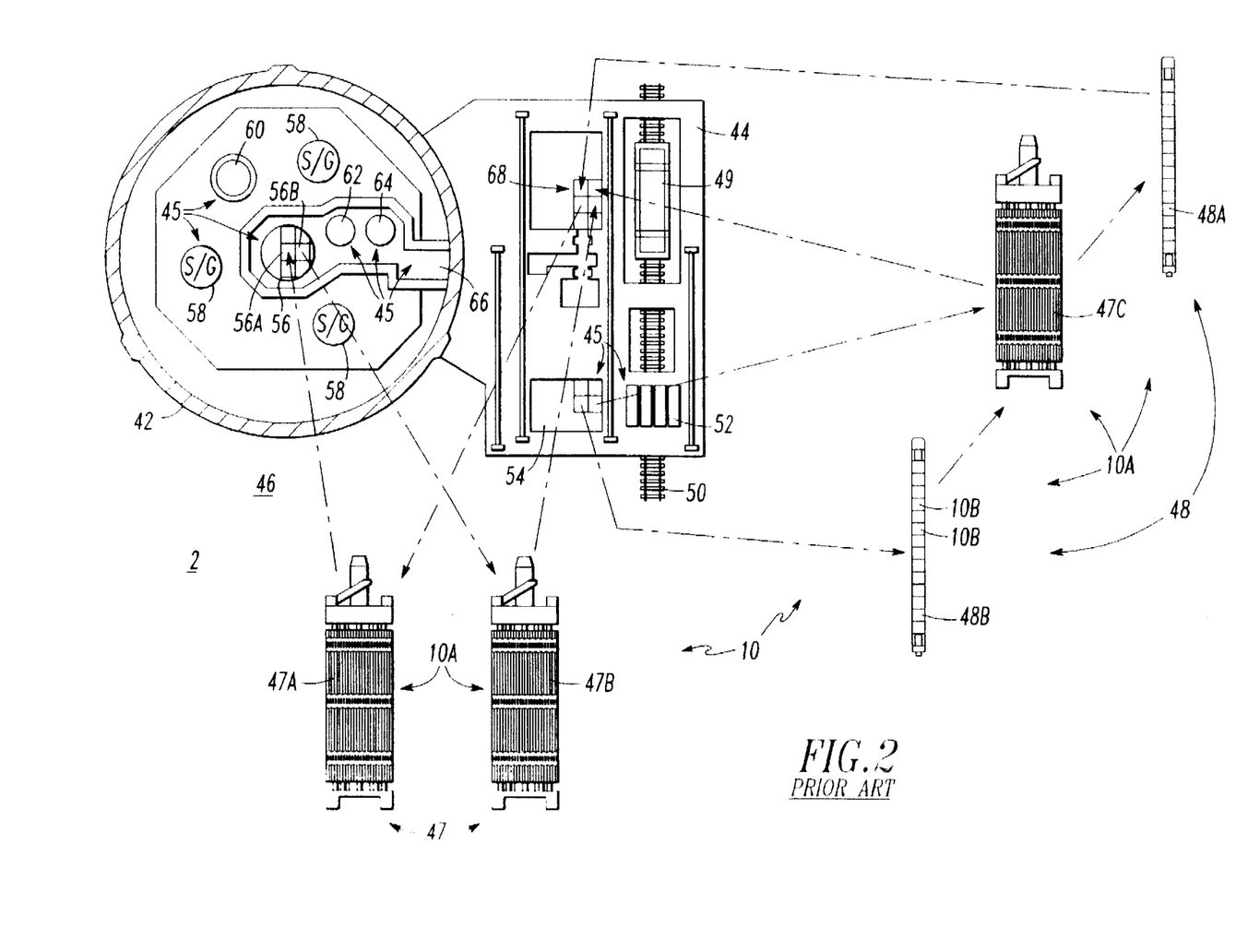
FIG. 2 is a schematic diagram of a containment vessel and a fuel building at an individual power plant site of a nuclear utility showing various nuclear power plant components in a variety of site locations.

Referring to FIG. 2, a schematic diagram of a containment vessel 42 and a fuel building 44 illustrates a plurality of different locations 45 at a nuclear utility site such as the exemplary individual nuclear power plant complex 46, although the locations 45 further include manufacturing facilities (not shown) for the components 10, other nuclear power plant complexes (not shown), and on-site and off-site storage facilities (not shown). The nuclear power plant components 10 include a wide variety of nuclear fuel components 10A such as, for example, nuclear fuel assemblies 47, nuclear fuel rods or pins 48, etc. The nuclear power plant components 10 also include special nuclear material (SNM) 10B (e.g., uranium or plutonium), and other non-fuel in-core or out-of-core components (e.g., BA's, RCCA's, thimble plugs, sources, spent fuel rack inserts, detectors, dummy assemblies, pellet cans, failed fuel cans, and boraflex coupon samples as well as other components located either inside or outside the reactor core) (not shown). As discussed below with FIG. 3, the data entry terminals 14A, 14B, 14C of FIG. 1 update the database 12 with the current location of the components 10 which are located in the exemplary locations 45 of FIG. 2.

The components 10 are first received at the complex 46 in an exemplary railroad car 49 on railroad 50. From the car 49, the components 10 are typically first transferred to a new fuel handling area 52 and, then, to a new fuel storage area 54. The containment 42 includes a reactor 56, a plurality of steam generators (S/G) 58, a head laydown area 60, a lower internals storage area 62 and an upper internals storage area 64. The components 10 are moved between the fuel building 44 and the containment 42 in a refueling canal 66. An individual fuel assembly (e.g., assembly 47A) is lowered into a selected location (e.g., location 56A) of the reactor 56 for operation therein. Later, during a subsequent refueling operation, another fuel assembly (e.g., assembly 47B) is raised from another location (e.g., location 56B) of the reactor 56 for transfer to a spent fuel pit 68. Then, a fuel rod 48A may be removed from a fuel assembly 47C and, in turn, may be replaced by another fuel rod 48B. Later, other components 10, such as fuel assemblies or pins (not shown), may be transferred by the railroad car 49 to an on-site or off-site storage facility (not shown) for final disposal.

As discussed in greater detail below with FIGS. 4 and 5A–5B, the information 4, 6, 8 of FIG. 1 may include general information related to the metallurgy, manufacturing, operation, refueling, inspection, or storage of the components 10. For example, component location, component arrival time at a location, special actions at a location, and departure time from a location may be included for any one of the components 10. Furthermore, burnup data is stored for fuel assemblies 47 and pins 48 and isotopic inventory data is stored for both in-core and out-of-core components 10. Qualitative inspection results (e.g., audio, still video and moving video) and quantitative inspection data (e.g., numerical) is storable for any of the individual components 10.

Figure 3:
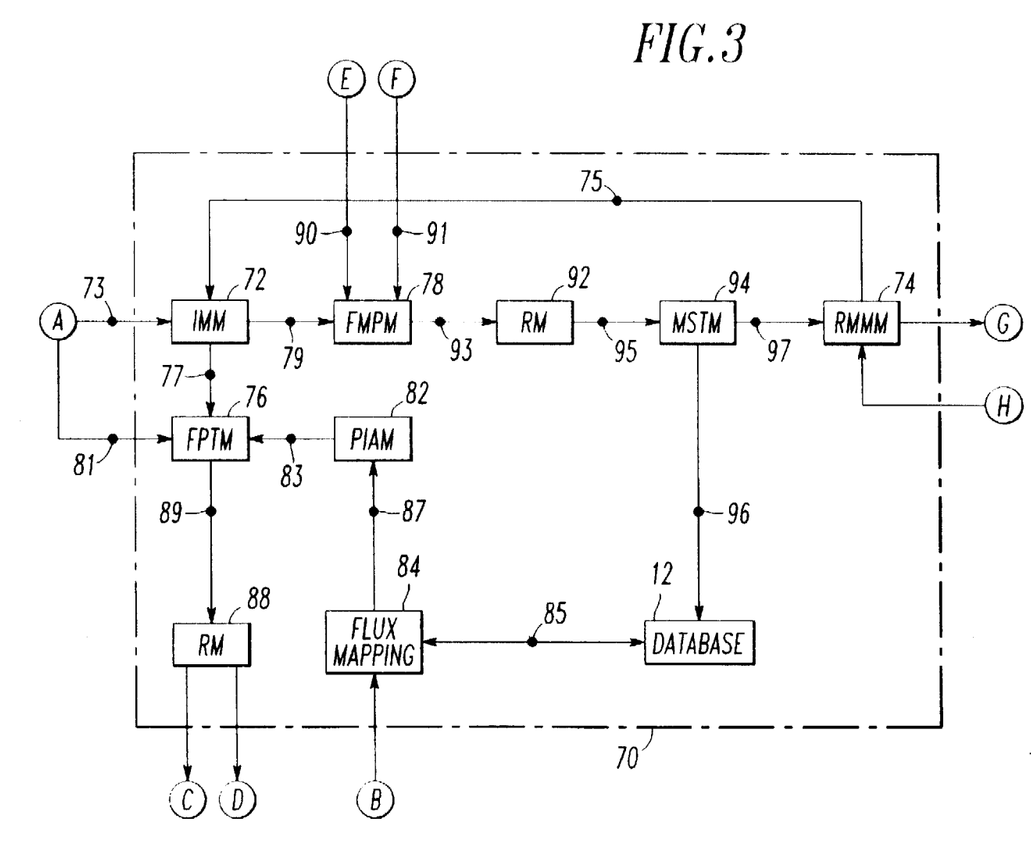
FIG. 3 is a software block diagram in accordance with the present invention.

FIG. 3 is a block diagram of software 70 executed by the integrated fuel management system 2 of FIG. 1. The software 70 includes an inventory management module (IMM) 72 which inputs on line 73 the initial component locations (e.g., locations 45, 49, 52, 54, 56, 58, 60, 62, 64, 66, 68 of FIG. 2, sub-locations such as 56A, 56B, etc.) from node A. The IMM 72 also inputs final component locations from a real-time movement monitoring module (RMMM) 74 on line 75. The lines 73, 75 are representative of the data entry terminals 14A, 14B, 14C of FIG. 1 and include both manually entered information as well as computer generated/entered information. The IMM 72 further inputs, as discussed below with FIGS. 5A–5B and 6E, information of the various historical components 10 at a particular location and, also, information of the various historical locations of an individual component 10.

Referring to FIGS. 1–3, the IMM 72 facilitates a variety of information entry and retrieval capabilities for the database 12, such as, for example, determining the current location of a particular component 10, the historical components of a particular location 45, the residence time of a particular component 10 at a specific location 45, burnup and/or isotopic inventories of a selected component 10, and other pertinent information. Current component locations, for example, are provided to a fuel properties tracking module (FPTM) 76 on line 77. Also, current and historical component locations are provided to a fuel movement planning module (FMPM) 78 on line 79.

Continuing to refer to FIG. 3, the FPTM 76 provides various utility users with access to a wide range of information about the individual fuel assemblies 47 of FIG. 2. The FPTM 76 inputs on line 81 the initial fuel properties information (e.g., fuel type, initial mass, burnup, isotopics, etc.) of the individual fuel assemblies 47 and pins 48, as well as other information for other components 10 such as, for example, fresh fuel isotopic inventories (i.e., uranium data for each pin 48 for accountability uses) which are downloaded directly from the manufacturing plant as discussed above with FIG. 1.

Revised SNM data (e.g., current assembly burnup, RAMS data (for each pin 48), k-infinity, power history, etc.) is input to the FPTM 76 from a proactive integration of activities module (PIAM) 82 on line 83. Changes in isotopic inventory are determined by a flux mapping system 84 (e.g., INCORE and TOTE) which inputs and processes a monthly flux map from node B as a function of the locations of particular components 10. The flux mapping system 84 accurately identifies the current component locations on line 85 from the database 12 as discussed below with FIG. 6D. In turn, the flux mapping system 84 calculates and enters isotopic updates, such as burnup data or isotopic data, for selected fuel assemblies 47 and pins 48 to the database 12 on line 85. Pinwise data is also maintained for any set of pins 48 which are identified by their historical locations as having originated in another fuel assembly 47. For example, isotopic data (i.e., KG per metric ton of initial uranium and/or plutonium metal) for a pin 48 which is removed from a fuel assembly 47 is assigned based on the isotopic data of such fuel assembly. Other information, such as an indication of the completion of a monthly flux map, and other information necessary for tasks such as fuel performance evaluations and depreciation calculations are transferred on line 87 to the PIAM 82.

In turn, the PIAM 82 generally provides an indication to the FPTM 76 that the flux mapping system 84 has completed the periodic flux map. In this manner, the PIAM 82 signals the FPTM 76, as well as all other affected users of the isotopic information, that such information has been updated in the database 12. With the information on lines 77, 81, 83, the FPTM 76 provides the important function of managing and tracking all SNM.

From the FPTM 76, SNM information is output to a reporting module (RM) 88 on line 89. The RM 88 is another exemplary process which is executed by the data retrieval terminals 16A, 16B, 16C of FIG. 1 for generating (e.g., electronically on disk, in hard copy, etc.) a report with a portion of the information from the database 12. The RM 88 automatically generates various reports (e.g., DOE/NRC form 741 transaction reports, form 742 material balance reports, form 742C physical inventory reports, etc.) using the information (i.e., fuel properties and isotopic inventory data) in the database 12 which is updated by the flux mapping system 84 and maintained by the PPTM 76. In turn, these reports and other automatically generated reports on fuel cost amortization are output to node C. Other historical reports of component and/or location chronology are output to node D.

The FMPM 78 executes a process which determines an optimized fuel shuffling sequence for use by site refueling personnel. The FMPM 78 minimizes the time and distance associated with moving the fuel assemblies 47 of FIG. 2 between various refueling locations. The FMPM 78 inputs current and historical component locations on line 79, a final core loading plan from node E on line 90, and a set of operational constraints from node F on line 91. The optimized fuel shuffling sequence for moving fuel assemblies 47 between the various refueling locations is determined from a selected combination of a variety of objective functions, such as, for example, time, distance of tool/crane travel, number of tool changes, and the desired approach to the core. The FMPM 78 also provides total offload, total reload, and in-core shuffle campaigns, along with the capability of re-optimizing a partially completed core reload in the event of a problem precluding the completion of the original loading sequence. The use of the current and historical component locations from the IMM 72 facilitates an automated level of error checking and ensures that the correct fuel assemblies 47 are selected and that storage sub-locations within the spent fuel pit 68 of FIG. 2 are available.

Another reporting module (RM) 92, similar to the RM 88, inputs on line 93 a set of movements for the fuel assemblies 47 (i.e., a shuffle sequence) from the FMPM 78. The exemplary RM's 88, 92 utilize an SQL query language in order to define custom report forms. The RM 92 also provides a set of reports including the component history of a particular location and the location history of a particular component. The RM 92 further provides a move sheet report, which summarizes a refueling campaign, to a move sequence tracking module (MSTM) 94 on line 95.

The MSTM 94 tracks movements of the fuel assemblies 47 and other components during refueling operations. Prior to a refueling campaign, a particular shuffle sequence from line 95 is entered. In turn, the MSTM 94 outputs a sequence of component moves and, also, keeps track of each component during movement thereof. As each individual movement is completed, the operators confirm the completion to the MSTM 94. Then, the MSTM 94 outputs a time-stamped record of such movement to the database 12 on line 96. For refuelings involving reconstitution of a fuel assembly 47, the MSTM 94 also tracks movements of pins 48 which are no longer part of their original fuel assembly 47.

At each component movement or shuffle step, the MSTM 94 outputs to the database 12 on line 96 an update of the location, history, time stamp and action status for the component being moved. In this manner, the MSTM 94 executes a process which updates the database 12 with a current location of a selected component. Concurrently, the MSTM 94 outputs on line 97 a sequence of moves to the real-time movement monitoring module (RMMM) 74. The RMMM 74 interfaces with an electronically indexable crane system at node G which, in turn, interfaces a refueling machine and a fuel handling machine (not shown). Crane indexers at node H in the spent fuel pit 68 and in the containment 42 of FIG. 2 indicate the current physical location of the components such as the fuel assemblies 47. In this manner, the RMMM 74 inputs the current physical location of the components (e.g., a previous location from which a fuel assembly 47 was taken, an intermediate location during component movement, a subsequent location where such fuel assembly 47 is placed, etc.).

Table I below includes a plurality of base classes (e.g., component, isotopic, location, history and inspection), classes and sub-classes of objects, and the contents of such objects within the database 12. The base class "component" includes classes for SNM, other SNM and non-SNM components. SNM components, in turn, include fuel assemblies and fuel pins. The base class "inspection" includes classes for qualitative multimedia inspections, such as audio, still video and motion video, and quantitative numerical inspections, such as ultrasonic testing inspections. Each of the objects 22 of FIG. 1 is identified by an object identifier (OID) which functions as a predefined pointer to the particular object (e.g., OBJECT N of FIG. 1) within the database 12. In this manner, each pointer identifies a particular object regardless of its storage location in the disk memory 24A of area 32 or the separate disk memory 24B of area 34 of FIG. 1.

TABLE I

| BASE CLASS | CLASS | SUB-CLASS | CONTENTS |
| --- | --- | --- | --- |
| COMPONENT | | | |
| | SNM_COMPONENTS | | |
| | | FUEL_ASSEMBLY | fuel assembly objects |
| | | FUEL_PIN | fuel pin objects |
| | OTHER_SNM_COMPONENTS | | other SNM objects |
| | NON_SNM_COMPONENTS | | non-SNM objects |
| ISOTOPIC | | | |
| | BURNUP | | burnup data of an in-core object |
| | DECAY | | burnup data of an out-of-core object |
| LOCATION | | | |
| | FIXED_LOCATION | | location objects |
| | TRANSIENT_LOCATION | | location objects |

TABLE I-continued

| BASE CLASS | CLASS | SUB-CLASS | CONTENTS |
|---|---|---|---|
| HISTORY | | | |
| | LOCATION_HISTORY | | location history objects |
| | COMPONENT_HISTORY | | component history objects |
| INSPECTION | | | |
| | MULTIMEDIA_INSPECTION | | |
| | | AUDIO | audio inspection objects |
| | | STILL_VIDEO | still video inspection objects |
| | | MOTION_VIDEO | motion video inspection objects |
| | NUMERICAL_INSPECTION | | |
| | | UT_INSPECTION | numerical inspection objects |

Figure 4:
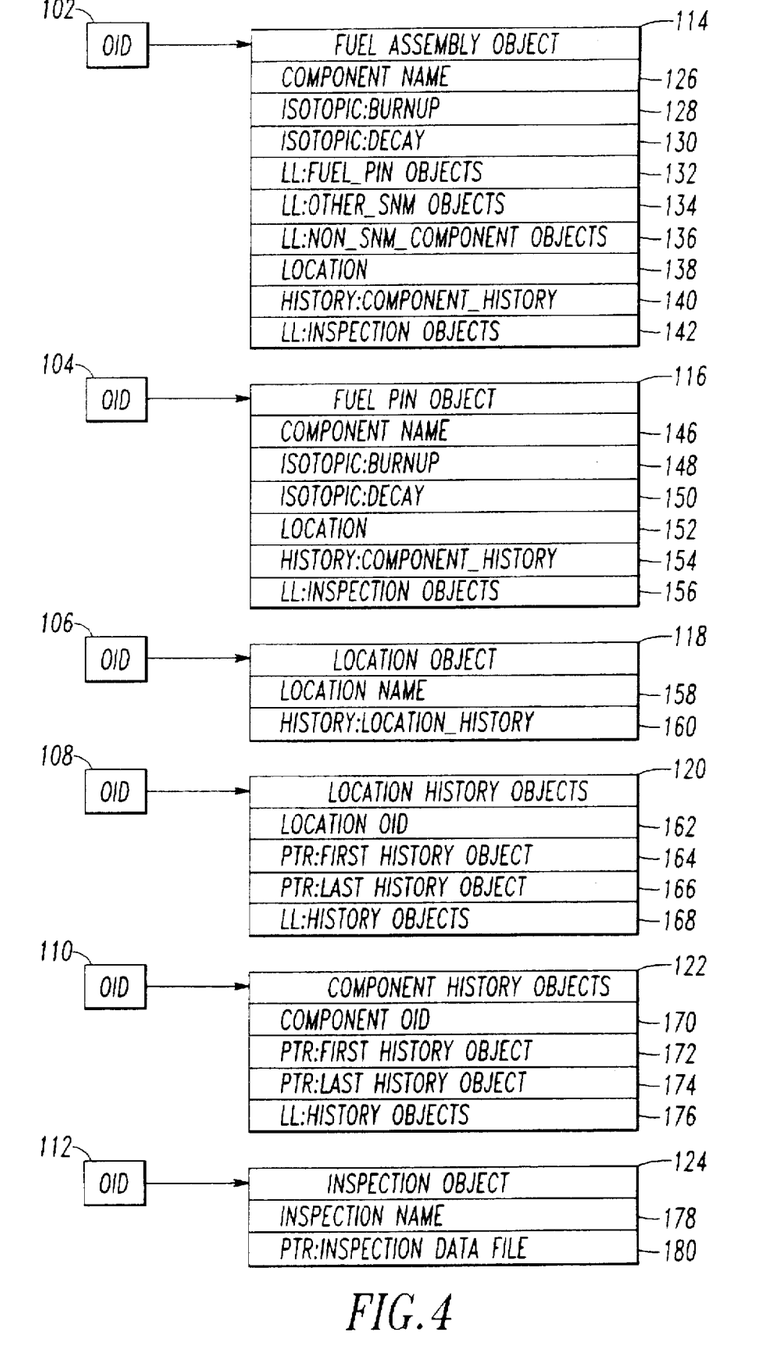
FIG. 4 is a diagram of an object oriented data structure for a database which stores information concerning various nuclear power plant components in accordance with the present invention.

FIG. 4 illustrates exemplary object identifiers (OID's) 102, 104, 106, 108, 110, 112 for respective objects fuel assembly object 114, fuel pin object 116, location object 118, location history objects 120, component history objects 122, and inspection object 124. Table II below defines the terms ":", "LL" and "PTR" which are used herein.

TABLE II

| TERM | DEFINITION |
|---|---|
| ":" | defines an element relationship (e.g., OID:LOCATION is the object identifier of the current location of the present object); |
| "LL" | is a linked list of objects (e.g., LL:FUEL_PIN OBJECTS is a linked list of fuel pin object identifiers for fuel pins of the present fuel assembly object); and |
| "PTR" | is a pointer to an object (e.g., PTR:ISOTOPIC:BURNUP is a pointer to the burnup data of a particular component object. |

The OID 102, for example, points to the location of a particular fuel assembly object 114. The fuel assembly object 114 contains the following data fields associated with the object 114: a component name 126 (e.g., FUEL ASSEMBLY 12345), an OID 128 for the burnup data, an OID 130 for the decay data, a linked list 132 of OID's of fuel pins which are located within this fuel assembly, a linked list 134 of OID's of other SNM objects which are located within this fuel assembly, an OID 138 of the current location, an OID 140 of the component history, and a linked list 142 of OID's of inspection objects for this fuel assembly object 114.

The exemplary OID 104 for the fuel pin object 116 points to locations which normally contain some or all of the following data fields associated with the object 116: a component name 146 (e.g., FUEL PIN 7891234), an OID 148 for the burnup data, an OID 150 for the decay data, an OID 152 of the current location (i.e., under normal circumstances, the OID of a fuel assembly containing this fuel pin), an OID 154 of the component history, and a linked list 156 of OID's of inspection objects for this fuel pin object 116.

The exemplary OID 106 for the location object 118 points to locations which contain the name 158 of this particular location (e.g., REACTOR CORE LOCATION H-08) and an OID 160 for a set of location history objects 120 associated with this particular location. In turn, for example, the OID 108 for the location history objects 120 points to locations which contain the following data: the OID 162 for the particular location associated with the location history objects 120, a pointer 164 to the first history object of these objects 120, a pointer 166 to the last history object of these objects 120, and a linked list 168 of individual history objects (e.g., history objects H11, H22, H33, H44 of FIG. 5A).

Figure 5A:
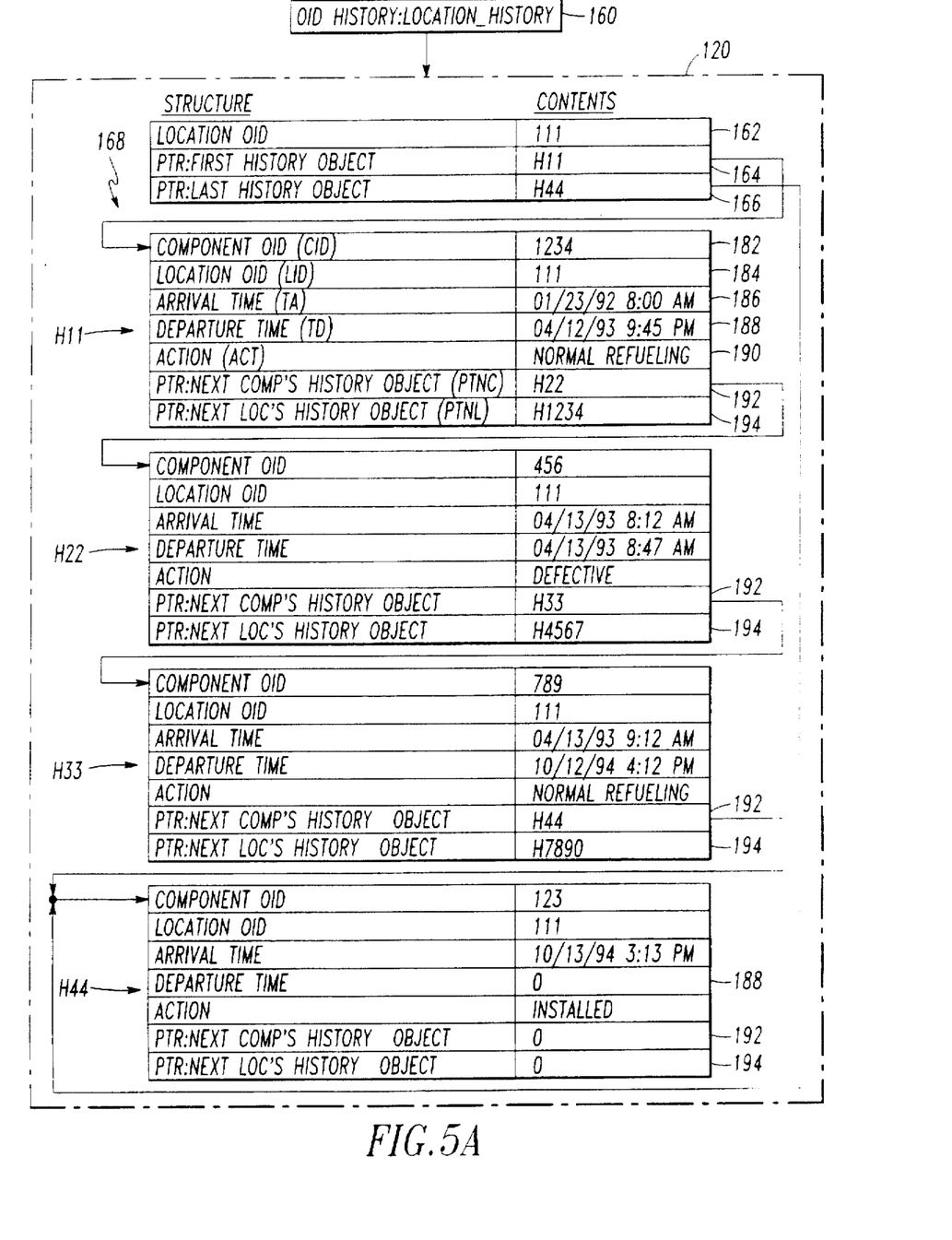
FIG. 5A are data structures for the location history of FIG. 4.
Figure 5B:
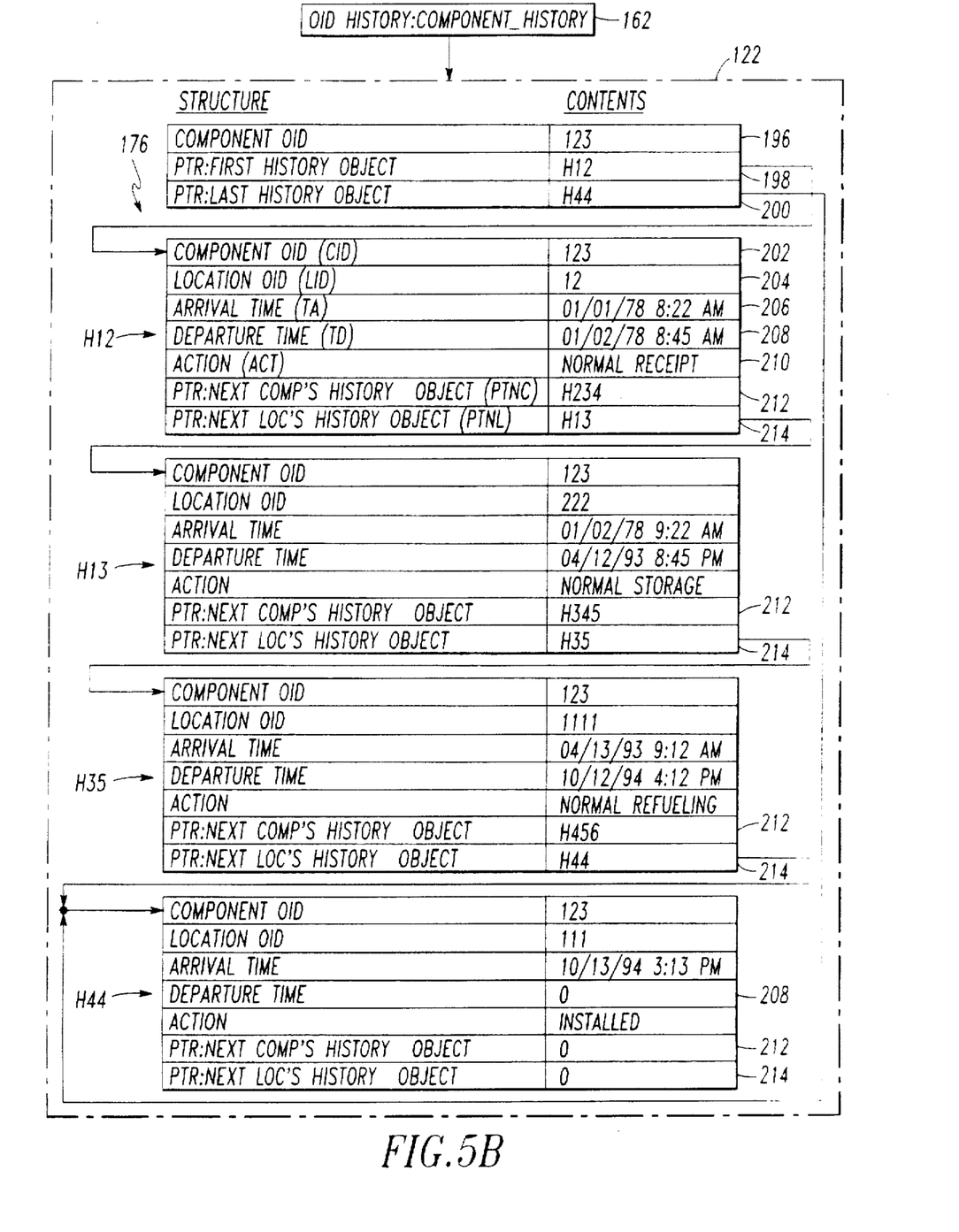
FIG. 5B are data structures for the component history of FIG. 4.

The OID 110 for the component history objects 122 points to locations which contain the following data: the OID 170 for the particular component associated with the component history objects 122, a pointer 172 to the first history object of these objects 122, a pointer 174 to the last history object of these objects 122, and a linked list 176 of individual history objects (e.g., history objects H12, H13, H35, H44 of FIG. 5B).

The OID 112 for the inspection object 124 points to locations which contain the following data: the inspection name 178 (e.g. MOTION VIDEO OF FUEL ASSEMBLY 12345), and a pointer 180 to a file of data containing the particular inspection information.

FIGS. 5A and 5B are data structures for the location history objects 120 and component history objects 122, respectively, of FIG. 4. As discussed above with FIG. 4, the object for each of the nuclear power plant components 10 of FIG. 2 includes a component history OID 140, and the object for each of the locations for the nuclear power plant components 10 includes a location history OID 160. Referring to FIG. 5A, the OID 160 points to a set of location history objects 120 for the particular location (i.e., 111) associated with OID 162. The data for the location history objects 120 includes the location OID 162 for an exemplary location number 111, a pointer 164 to the first (i.e., H11) of four exemplary history objects H11, H22, H33, H44 which are contained in the linked list 168, and a pointer 166 to the last (i.e., H44) of such four history objects.

Each of the individual history objects H11, H22, H33, H44 has an identical structure and includes data fields (as shown with object H11) for a component OID (CID) 182, a location OID (LID) 184, an arrival time and date stamp (TA) 186, a departure time and date stamp (TD) 188, an action (ACT) 190 (e.g., a code associated with an action, text describing an action, etc.), a pointer 192 to the next history object for the next component for the location OID's 162, 184, and a pointer 194 to the next history object for the next location for the component OID 182. Therefore, each of the individual history objects H11, H22, H33, H44 defines, for a component and a location, the arrival time of the component at the location, the departure time of the component from the location, the last action associated with the component at the location, the next component for the location (defined by the pointer 192), and the next location for the component (defined by the pointer 194).

History object H44 illustrates a special case where the component remains at the location. In other words, this object H44 represents both the current location of the component and the current component at such location. This is indicated, in the exemplary embodiment, whenever the departure time and date stamp 188 and the pointers 192, 194 are set to, for example, zero, although equivalent embodiments may use any selected value. Another special case (not shown) for an empty location is indicated whenever the component OID 182 is a selected value (e.g., zero). As shown in FIG. 5A, the value of the exemplary location OID 184 is always set to 111 which is the same as the value of the exemplary location OID 162. The value of the exemplary component OID 182 for the history objects H11, H22, H33, H44 changes from 1234 to 456 to 789 to 123, respectively. This represents the four components which have chronologically occupied the particular location of OID 162. In the history object H11, the pointer 192 for the next component's history object is linked to the next history object H22. In turn, the pointers 192 for the history objects H22 and H33 are linked to the history objects H33 and H44, respectively. Finally, the pointer 192 for the last history object H44 has the exemplary value of zero which indicates that there are no further history objects for the associated location of OID's 162, 184 (e.g., 111).

Referring to FIG. 5B, the OID 162 points to a set of component history objects 122 for the component associated with OID 196. The data for the location history objects 122 includes the component OID 196 for an exemplary component number 123, a pointer 198 to the first (i.e., H12) of four exemplary history objects H12, H13, H35, H44 which are contained in the linked list 176, and a pointer 200 to the last (i.e., H44) of such four history objects.

Each of the history objects H12, H13, H35, H44 has a structure identical to the history objects H11, H22, H33, H44 of FIG. 5A (with H44 being the identical history object 44 in both FIGS. 5A and 5B). The exemplary history object H12 includes data fields for a component OID 202, a location OID 204, an arrival time and date stamp 206, a departure time and date stamp 208, an action 210, a pointer 212 to the next history object for the next component for the location OID 204, and a pointer 214 to the next history object for the next location for the component OID's 196, 202. Therefore, each of the individual history objects H12, H13, H35, H44 defines for a component and a location, the arrival time of the component at the location, the departure time of the component from the location, the last action associated with the component at the location, the next component for the particular location (defined by the pointer 212), and the next location for the particular component (defined by the pointer 214).

In a similar manner as discussed above with FIG. 5A, history object H44 illustrates the special case where the component remains at the location (i.e., the departure time and date stamp 208 and the pointers 212, 214 are the exemplary zero value). As shown in FIG. 5B, the value of the component OID 202 for each of the history objects H12, H13, H35, H44 is always set to 123 which is the same as the value of the component OID 196. The value of the location OID 204 for the history objects H12, H13, H35, H44 changes from 12 to 222 to 1111 to 111, respectively. In the history object H12, the pointer 214 for the next component's history object is linked to the next history object H13. In turn, the pointers 214 for the history objects H13 and H35 are linked to the history objects H35 and H44, respectively. Finally, the value of the pointer 214 for the last history object H44 is the exemplary value zero which indicates that there are no further history objects for the component associated with the OID's 196, 202.

Figure 6A:
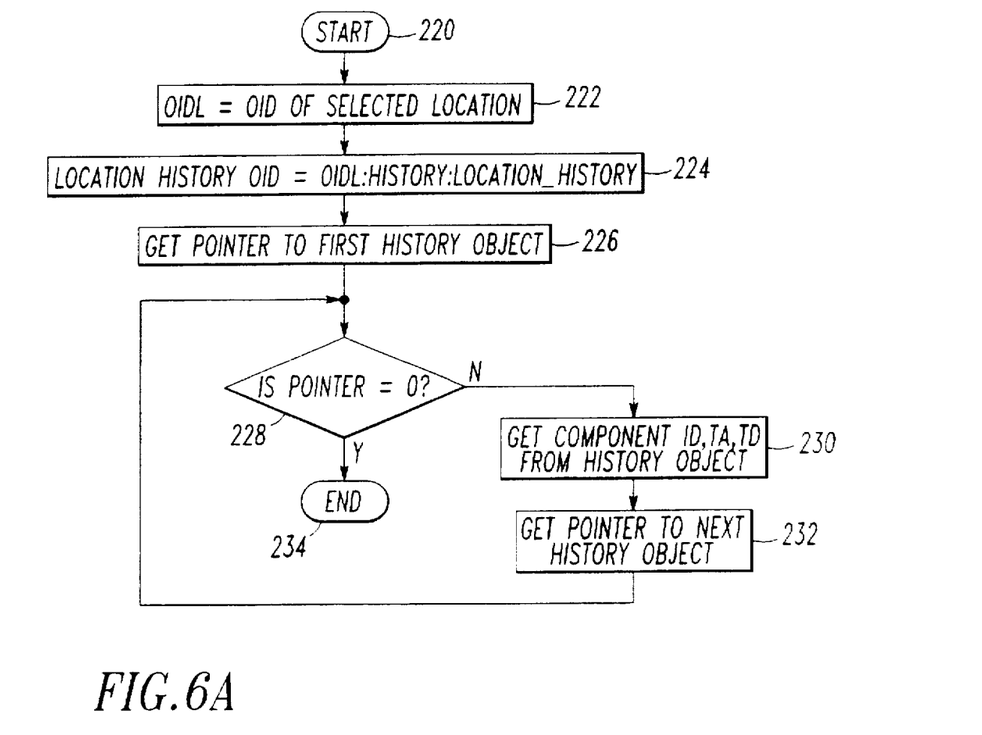
FIG. 6A is a software flowchart for determining the historical components of a particular location.

Referring to FIGS. 6A-6E, software flowcharts of routines for entering and retrieving information from the object oriented data structure 22 of the database 12 of FIG. 1 are illustrated. These routines are utilized, for example, by processes of the data retrieval terminals 16A, 16B, 16C to retrieve the information 4, 6, 8 concerning various nuclear power plant components 10 of FIG. 1. FIG. 6A is a flowchart which determines the historical components of a particular location. After starting at step 220, the variable OIDL is set equal to the OID of a selected location at step 222. This location is selected, for example, by a manual user selection of an OID associated with a location at one of the terminals 16A, 16B, 16C, or by a process automatically selecting such OID from an array of predetermined locations and OID's. Next, at step 224, the OID of the location history is determined as discussed above with FIG. 4 (i.e., the OID 106 is utilized to obtain the associated OID for the HISTORY:LOCATION_HISTORY 160). Then, at step 226, the pointer to the first history object 164 is obtained (as discussed above with FIG. 5A). At step 228, if this pointer is non-zero, then step 230 is executed to obtain the component ID (CID), arrival time (TA) and departure time (TD) from the first history object (e.g., H11 of FIG. 5A). At step 232, the pointer to the next history object (e.g., H22 of FIG. 5A) is obtained from the previous history object (e.g., H11 of FIG. 5A) and step 228 is repeated. Steps 228-232 are repeated until, at step 228, the value of the pointer to the next history object is the exemplary zero value and, hence, all of the history objects have been accessed in order to obtain the CID's, TA's and TD's for the particular location. Finally, step 234 is executed to end the routine. In this manner, the data retrieval terminals 16A, 16B, 16C of FIG. 1 process the information 4, 6, 8 and determine which of the nuclear power plant components 10 have resided at a selected one of the locations.

Figure 6B:
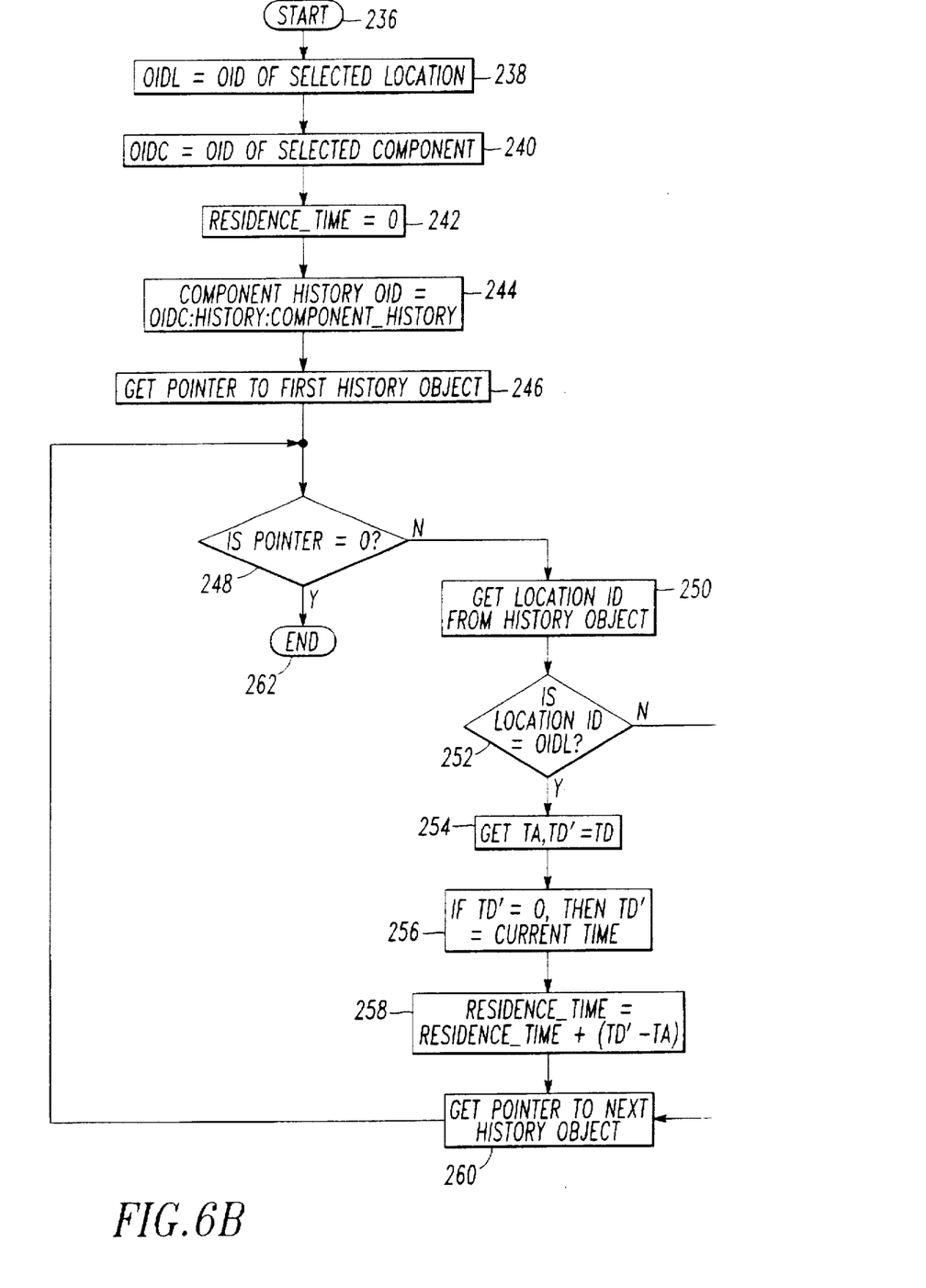
FIG. 6B is a software flowchart for determining the total residence time of a particular component at a specific location.

FIG. 6B is a flowchart for determining the total residence time of a selected one of the components 10 at a specified location 45 of FIG. 2. After starting at step 236, the variable OIDL is set equal to the OID of a selected location at step 238 in a like manner as discussed above with FIG. 6A. At step 240, the variable OIDC is similarly set equal to the OID of a selected component. The variable RESIDENCE_TIME is preset to zero at step 242. Then, at step 244, the OID of the component history is determined as discussed above with FIG. 4 (i.e., the OID 102 is utilized to obtain the associated OID for the HISTORY:COMPONENT_HISTORY 140). At step 246, the pointer to the first history object 198 is obtained (as discussed above with FIG. 5B). Next, at step 248, if this pointer is non-zero, then step 250 is executed to obtain the location ID (LID) from the first history object (e.g., H12 of FIG. 5B). At step 252, this location ID is compared to OIDL and, if equal, the arrival time (TA) and departure time (TD'=TD) are obtained at step 254 in a like manner as the location ID (LID) from the first history object. Otherwise, if the location ID is not equal to OIDL, then execution resumes at step 260 as discussed below. Following step 254, at step 256, if the departure time (TD') is zero, then the departure time (TD') is set to the current time. At step 258, the most recent residence time at the particular location (TD'-TA) is added to the accumulated RESIDENCE_TIME. Next, at step 260, the pointer to the next history object (e.g., H13 of FIG. 5B) is obtained from the previous history object (e.g., H12 of FIG. 5B) and step 248 is repeated. Steps 248–260 are repeated until, at step 248, the value of the pointer to the next history object is the exemplary zero value and, hence, all of the history objects have been accessed in order to obtain the TA's and TD's for the particular component and location. Finally, at step 248, when this pointer is zero and all of the history objects have been accessed, step 262 is executed to end the routine.

Figure 6C:
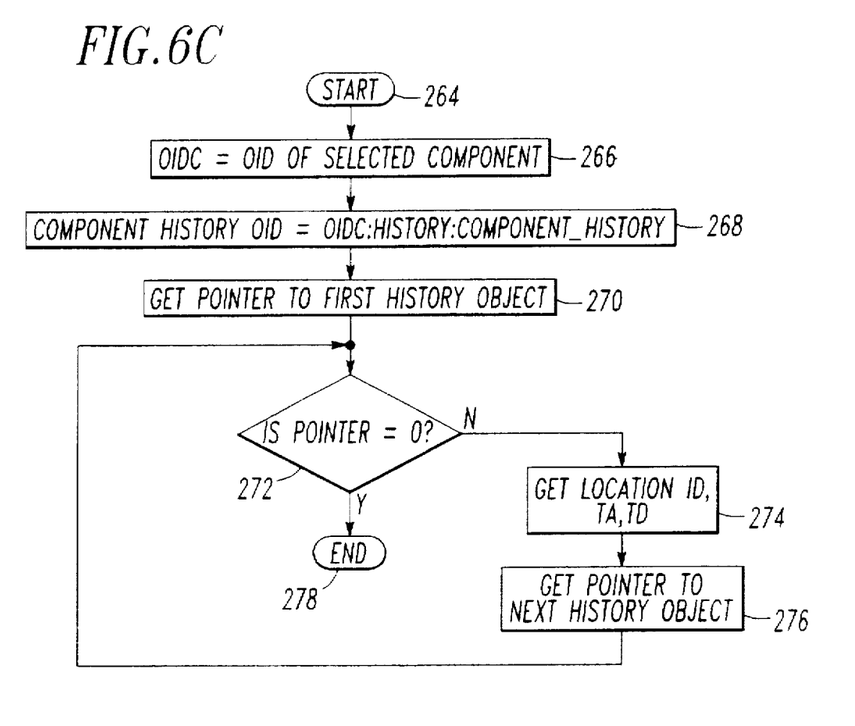
FIG. 6C is a software flowchart for determining the historical locations of a particular component.

FIG. 6C is a flowchart for determining the historical locations of a selected component. After starting at step 264, the variable OIDC is set equal to the OID of a selected component at step 266 in a like manner as discussed above with FIG. 6B, step 240. Then, at step 268, the OID of the component history is determined as discussed above with FIG. 4 (i.e., the OID 102 is utilized to obtain the associated OID for the HISTORY:COMPONENT_HISTORY 140). At step 270, the pointer to the first history object is obtained (as discussed above with FIG. 5B). At step 272, if this pointer is non-zero, then step 274 is executed to obtain the location ID (LID), arrival time (TA) and departure time (TD) from the first history object (e.g., H12 of FIG. 5B). At step 276, the pointer to the next history object (e.g., H13 of FIG. 5B) is obtained from the current history object (e.g., H12 of FIG. 5B) and step 272 is repeated. Steps 272–276 are repeated until, at step 272, the value of the pointer to the next history object is the exemplary zero value and, hence, all of the history objects have been accessed in order to obtain the LID's, TA's and TD's for the particular component. Finally, at step 272, when this pointer is zero and all of the history objects have been accessed in order to obtain all of the locations, step 278 is executed to end the routine.

Figure 6D:
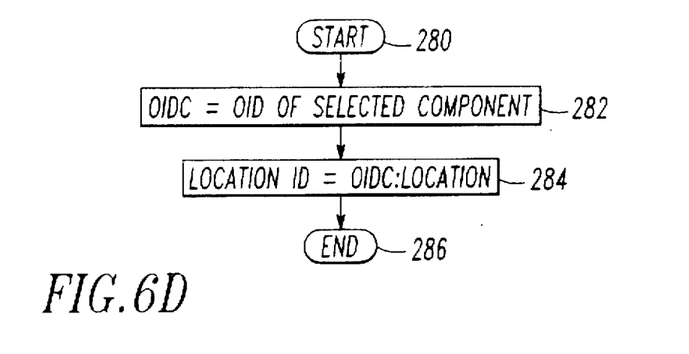
FIG. 6D is a software flowchart for determining a current location of a particular component.

FIG. 6D is a flowchart for determining a current location for a particular component. After starting at step 280, the variable OIDC is set equal to the OID of a selected component at step 282 in a like manner as discussed above with FIG. 6B, step 240. Then at step 284, the OID of the component's location is determined (e.g., LOCATION 138 as discussed above with FIG. 4) and the routine exits at step 286.

Figure 6E:
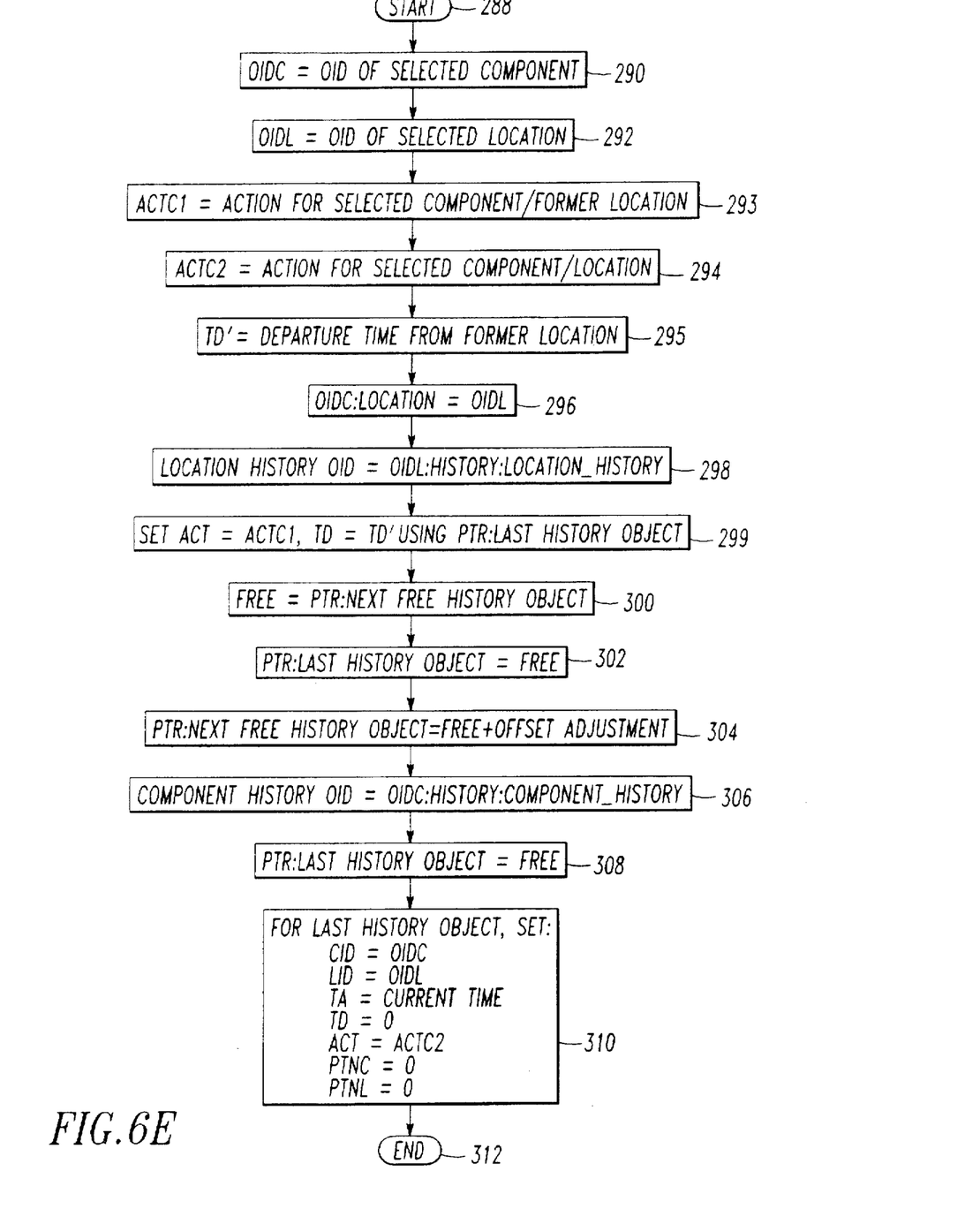
FIG. 6E is a software flowchart for updating the component history and location history after moving a particular component from a former location to a new location.

FIG. 6E is a flowchart for updating the component history and location history after removing a particular component from a former location and moving such component to a new location. After starting at step 288, the variable OIDC is set equal to the OID of a selected component at step 290 and the variable OIDL is set equal to the OID of a selected location at step 292 in a like manner as discussed above with FIG. 6B. In a similar manner, at steps 293–295, the variable ACTC1 is set equal to the action or action code for the former location, the variable ACTC2 is set equal to the action or action code for the selected component and location, and the variable TD' is set equal to the departure time from the former location, respectively. Then, at step 296, the location OID for the selected component is set equal to OIDL. At step 298, the OID of the location history is determined as discussed above with FIG. 6A, step 224. Then, at step 299, using PTR:LAST HISTORY OBJECT 166 of FIG. 5A, TD of the last history object is set to TD' and ACT is set to ACTC1.

At step 300, the variable FREE is set equal to a pointer, maintained by the database 12, to the next free history object (i.e., the next free location within the database 12 for a new history object). Using the OID of the location history from step 298, at step 302, the pointer to the last history object 166 of FIG. 5A is adjusted to the next free location before the pointer to the next free history object is adjusted as appropriate at step 304. Then, at step 306, the OID of the component history is determined as discussed above with FIG. 6C, step 268. At step 308, the pointer to the last history object 200 of FIG. 5B is set equal to FREE. Then, at step 310, for this new last history object, CID is set to OIDC, LID is set to OIDL, TA is set to the current time, TD is set to the exemplary zero value which signifies that the selected component is still present at the selected location, ACT is set to ACTC2, and the two pointers to the next history objects PTNC, PTNL are set to exemplary zero value which also signifies that the selected component is still present at the selected location and, hence, there are no further history objects for this selected component and location. Finally, at step 312, the routine exits.

The exemplary integrated data management system 2 of FIG. 1 provides a nuclear utility and vendors thereof with a single, widely accessible, regularly updated source for storing, maintaining and retrieving information associated with nuclear power plant components over a lifetime thereof. The information includes manufacturing data from a manufacturing plant, component inspection results, component locations and movements, fuel assembly burnup and isotopic inventory, and pin burnup and isotopic for pins that have been removed from their original fuel assemblies.

By accurately, immediately and continuously identifying component locations, the system 2 reduces the probability of fuel selection errors during refueling such as selecting the wrong assembly or attempting to place a spent assembly in an occupied storage location, eliminates the time required to resolve such errors, and reduces the possibility of NRC involvement. Further, the system provides a single, universally available, controlled access source for the various required information for nuclear fuel assemblies over a lifetime thereof.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An integrated data management system for compiling information concerning a plurality of nuclear power plant components, said integrated data management system comprising:

database means for maintaining said information over a lifetime of each of said nuclear power plant components;

data entry means for entering said information in said database means;

data retrieval means for retrieving said information from said database means, wherein said database means includes wide-area network communication means and at least one workstation means having means for storing at least a portion of said information, the workstation means executing a database process which accesses said information; and wherein said data entry means further includes at least one entry terminal, the wide-area network communication means interconnecting the workstation means and the entry terminal which transfers a portion of said information through the wide-area network communication means to the database process of the workstation means, wherein said data retrieval means includes a plurality of request terminals for retrieving and processing a selected portion of said information; and wherein the wide-area network communication means further interconnects the workstation means with the request terminals each of which requests the selected portion of said information through the wide-area network communication means from the database process of the workstation means.

2. The integrated data management system as recited in claim 1 wherein at least one of the request terminals includes report generation means for generating a report with the selected portion of said information.

3. An integrated data management system for compiling information concerning a plurality of nuclear power plant components, said integrated data management system comprising:

database means for maintaining said information over a lifetime of each of said nuclear power plant components;

data entry means for entering said information in said database means;

data retrieval means for retrieving said information from said database means, wherein said database means includes wide-area network communication means and at least one workstation means having means for storing at least a portion of said information, the workstation means executing a database process which accesses said information; wherein said data entry means includes a first terminal means; and wherein said data retrieval means includes a second terminal means; the wide-area network communication means interconnecting the workstation means, the first terminal means, and the second terminal means; the first terminal means transferring a first portion of said information through the wide-area network communication means to the database process of the workstation means; the second terminal means requesting a second portion of said information through the wide-area network communication means from the database process of the workstation means.

4. The integrated data management system as recited in claim 3 wherein one of said nuclear power plant components is manufactured at a manufacturing site; and wherein said data entry means includes means for entering manufacturing information pertaining to said one nuclear power plant component at the manufacturing site.

5. The integrated data management system as recited in claim 3 wherein said data retrieval means includes means for retrieving said information pertaining to said nuclear power plant components at the manufacturing site.

6. The integrated data management system as recited in claim 3 wherein said data retrieval means includes data processing means for processing said information and determining a residence time for one of said nuclear power plant components at one of the locations.

7. The integrated data management system as recited in claim 3 wherein said data retrieval means includes data processing means for processing said information and determining a current location for one of said nuclear power plant components.

8. The integrated data management system as recited in claim 3 wherein said data entry means includes calculation means for calculating a nuclear parameter for one of said nuclear power plant components and entering the nuclear parameter in said database means.

9. The integrated data management system as recited in claim 8 wherein the calculation means includes means calculating the nuclear parameter as a function of the location of said one of said nuclear power plant components.

10. The integrated data management system as recited in claim 3 wherein said data entry means includes real-time means for updating said database means with a current location for one of said nuclear power plant components.

11. The integrated data management system as recited in claim 10 wherein said nuclear power plant components are located in at least three locations; and wherein the data processing means includes means calculating a sequence for moving said nuclear power plant components between said at least three locations.

12. The integrated data management system as recited in claim 3 wherein said nuclear power plant components include a nuclear non-fuel component and a nuclear fuel component.

13. The integrated data management system as recited in claim 12 wherein the nuclear fuel component is a nuclear fuel assembly.

14. The integrated data management system as recited in claim 12 wherein the nuclear fuel component is a nuclear fuel rod.

* * * * *